(12) United States Patent
Peters

(10) Patent No.: US 11,002,168 B2
(45) Date of Patent: May 11, 2021

(54) ASHING A PARTICULATE FILTER IN A MOTOR VEHICLE

(71) Applicant: Bayerische Motoren Werke Aktiengesellschaft, Munich (DE)

(72) Inventor: Nikita Peters, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/968,205

(22) PCT Filed: Mar. 13, 2019

(86) PCT No.: PCT/EP2019/056229
§ 371 (c)(1),
(2) Date: Aug. 7, 2020

(87) PCT Pub. No.: WO2019/197110
PCT Pub. Date: Oct. 17, 2019

(65) Prior Publication Data
US 2021/0025305 A1    Jan. 28, 2021

(30) Foreign Application Priority Data

Apr. 13, 2018   (DE) .................... 10 2018 205 602.1

(51) Int. Cl.
*F01N 3/20* (2006.01)
*B01D 53/94* (2006.01)
(Continued)

(52) U.S. Cl.
CPC ......... *F01N 3/206* (2013.01); *B01D 53/9454* (2013.01); *F01N 3/035* (2013.01);
(Continued)

(58) Field of Classification Search
CPC combination set(s) only.
See application file for complete search history.

(56) References Cited

U.S. PATENT DOCUMENTS 10,287,938 B2 *   5/2019   Warner .................. F01N 3/023
10,323,605 B2 *   6/2019   Miller .................... F02M 25/03
(Continued)

FOREIGN PATENT DOCUMENTS

| | | |
|---|---|---|
| DE | 678 446 C | 7/1939 |
| DE | 10 2016 103 735 A1 | 9/2017 |
| WO | WO 2019/048237 A1 | 3/2019 |

OTHER PUBLICATIONS

International Search Report (PCT/ISA/210) issued in PCT Application No. PCT/EP2019/056229 dated May 23, 2019 with English translation (four (4) pages).

(Continued)

*Primary Examiner* — Binh Q Tran
(74) *Attorney, Agent, or Firm* — Crowell & Moring LLP

(57) ABSTRACT

A method is provided for operating an internal combustion engine in a motor vehicle, The internal combustion engine has at least one cylinder with a combustion chamber, a water injection unit with a tank and at least one injection nozzle for directly or indirectly injecting water into the combustion chamber, an exhaust gas system with at least one exhaust gas catalytic converter and a particulate filter device which has a particulate filter for filtering particles out of an exhaust gas flow guided in the exhaust gas system. A control unit is provide for a state monitoring process and for controlling the combustion in the cylinder.

12 Claims, 2 Drawing Sheets

(51) Int. Cl.
  *F01N 3/035* (2006.01)
  *F01N 3/08* (2006.01)
  *F02D 41/00* (2006.01)
  *F02D 41/02* (2006.01)
  *F02M 25/022* (2006.01)
  *F02M 25/028* (2006.01)
  *F02M 25/03* (2006.01)

(52) U.S. Cl.
  CPC ....... *F01N 3/0821* (2013.01); *F02D 41/0025* (2013.01); *F02D 41/0235* (2013.01); *F02M 25/028* (2013.01); *F02M 25/0222* (2013.01); *F02M 25/0227* (2013.01); *F02M 25/03* (2013.01); *F01N 2430/04* (2013.01); *F01N 2610/00* (2013.01); *F01N 2610/1406* (2013.01)

(56) References Cited

U.S. PATENT DOCUMENTS

| | | | |
|---|---|---|---|
| 10,738,679 B2* | 8/2020 | Hittig | F01N 3/0232 |
| 10,874,984 B2* | 12/2020 | Gonzalez | B01D 53/925 |
| 2003/0226312 A1 | 12/2003 | Roos et al. | |
| 2006/0266307 A1* | 11/2006 | Mezheritsky | F02M 25/0227 123/25 C |
| 2014/0116033 A1* | 5/2014 | Otsuki | B01D 46/32 60/297 |
| 2016/0363019 A1 | 12/2016 | Warner et al. | |
| 2019/0040777 A1* | 2/2019 | Eriksson | F01N 3/0821 |

OTHER PUBLICATIONS

German-language Written Opinion (PCT/ISA/237) issued in PCT Application No. PCT/EP2019/056229 dated May 23, 2019 (six (6) pages).

German-language Office Action issued in German Application No. 10 2018 205 602.1 dated Mar. 7, 2019 with English translation (eight (8) pages).

German-language Decision to Grant issued in German Application No. 10 2018 205 602.1 dated May 29, 2019 with English translation (16 pages).

* cited by examiner

ASHING A PARTICULATE FILTER IN A MOTOR VEHICLE

BACKGROUND AND SUMMARY OF THE INVENTION

The invention relates to the use of a mixture of water and at least one further component for injection into a combustion chamber of an internal combustion engine. In addition, the invention relates to an internal combustion engine, in particular a spark-ignition engine, for a motor vehicle with a water injection system, and to a method for operating an internal combustion engine with a water injection system.

In the endeavor to improve the quality of exhaust gases of internal combustion engines in motor vehicles by reducing the emission of pollutants ever further, manufacturers of motor vehicles and, in particular also the manufacturers of exhaust-gas systems, have proceeded to use particulate filters in the exhaust-gas system even of spark-ignition engines, in particular in order to avoid an emission of particulates.

The invention is described below in the context of particulate filters for spark-ignition engines, but is usable according to its basic concept for all particulate filters in air guides and exhaust-gas guides of motor vehicles, optionally with standard adaptations in the art to the corresponding application.

Particulate filters for spark-ignition engines (also called Otto particulate filters OPFs) are being fitted into the exhaust-gas guide of the exhaust-gas system of ever more new vehicles in order to filter ash particulates and/or soot particulates there out of the exhaust gas. While soot particulates which are trapped in the particulate filter can be removed pyrolytically from the particulate filter, for example by means of the passage of a very hot exhaust-gas flow, the ash particulates introduced generally remain there until the end of the service life of the particulate filter if they are not removed mechanically—for example with manual emptying.

In particular if a new particulate filter is introduced into the exhaust-gas system, as rapid an ashing as possible is even desirable up to a certain degree of loading. This is because the particulate filters have poorer and therefore insufficient filtration efficiency so long as they do not yet have a certain minimum degree of loading with ash particulates. However, preloading of the particulate filter with ash prior to the installation in the vehicle is impractical in manufacturing and prone to error during the installation, and therefore the particulate filters in new vehicles or during exchange at the garage are typically not preloaded with ash.

In order, despite a new particulate filter, to arrive as rapidly as possible at a sufficient or optimum filtration efficiency, tests have been carried out in-house by the applicant where vehicles with new particulate filters have been filled with a fuel containing an ash-former additive.

This has proven disadvantageous in that, at certain engine operating points, and in particular at certain exhaust-gas temperatures, the increased admission of ash sometimes damaged the functionality of the catalytic converter or the lambda probe.

Taking this as the starting point, it is an object of the invention to achieve the rapid ashing required for optimized filtration efficiency of the particulate filter in an improved manner. This requires in particular an improved method for operating an internal combustion engine and/or an improved internal combustion engine.

This object is achieved by the use of a mixture of water and at least one further component for indirect or direct injection into a combustion chamber of an internal combustion engine of a motor vehicle, by a method for operating an internal combustion engine, and by an internal combustion engine, in accordance with the independent claims. A motor vehicle with such an internal combustion engine is also provided.

According to one aspect of the invention, a mixture of water and at least one further component is used for the indirect or direct injection into a combustion chamber of an internal combustion engine of a motor vehicle. The further component of the mixture is an ash former.

A direct injection into the combustion chamber can be understood as meaning, for example, that the water injection system has a separate injection nozzle for the injection into the combustion chamber, i.e. a further injector in addition to the fuel injector. However, for example, a direct injection into a combustion chamber can also be understood as meaning that an injection nozzle of the water injection system and a fuel injector are formed together for the respective injection into the combustion chamber. Indirect injection into the combustion chamber can be understood as meaning, for example, that the water and ash-former mixture is already added to the fuel and air mixture in the common rail (for example by means of a common injection nozzle), or a separate injection nozzle for the water and ash-former mixture is provided in the intake manifold (or in general terms in the feed pipe) upstream of the combustion chamber.

An ash former should be understood here as meaning in particular a substance or a substance mixture which, in particular as a component of a water and ash-former mixture, forms ash particulates upon combustion in the combustion chamber of the internal combustion engine. According to various embodiments, the ash former used can be, for example, a component which has a metal salt or is composed of the latter. For example, use can be made of a nitrate (for example magnesium nitrate), a sulfate (for example magnesium sulfate), a chloride (for example magnesium chloride) or a sulfide (for example magnesium sulfide) of magnesium, calcium, zinc, molybdenum, silicon, aluminum or titanium.

According to one embodiment, a concentration of the ash former in the mixture is between 100 ppm and 2000 ppm, in particular between 200 ppm and 1000 ppm, in order to permit an optimum compromise between rapid ashing and little impairment of the operation of the engine.

Depending on the ash former used, the ash former upon combustion forms an ash with or composed of a metal oxide, in particular magnesium oxide, calcium oxide, zinc oxide, molybdenum oxide, silicon oxide, aluminum oxide or titanium oxide.

Which of the chemical elements listed is/are mixed as the ash former with the water in the individual application is at the discretion of a person skilled in the art and generally at least depends on the type of internal combustion engine and/or on the designated engine operating points (in particular on the designated operating temperatures in the combustion chamber and in the exhaust-gas guide), and/or on the installed type of catalytic converter and/or on the composition and/or the size of the ash particulates required for improving the filtration efficiency of the particulate filter.

Depending on which type of mixture for the ash-former additive used in the individual case for mixing with water is more stable, it can be provided, according to different embodiments, that the mixture is an aqueous solution of the ash former in the water and/or a water-based suspension of the ash former and of the water. If, for example, the ash-former additive has more than one chemical compound, both a solution and a suspension with the water can be provided.

According to a further aspect of the invention, a method for operating an internal combustion engine in a motor vehicle is provided, wherein the internal combustion engine in particular has: a) at least one cylinder with a combustion chamber, b) a water injection system with a tank and at least one injection nozzle for directly or indirectly injecting water into the combustion chamber, c) an exhaust-gas system with at least one exhaust-gas catalytic converter and a particulate filter device which has a particulate filter for the filtration of particulates, in particular of soot and/or ash particulates, out of an exhaust-gas flow conducted out of the combustion chamber in the exhaust-gas system, d) a control unit for condition monitoring, in particular by means of determination of a filter condition, and for controlling the combustion in the cylinder.

The method is carried out by filling the tank of the water injection system with a mixture of water and an ash former, in particular with a water and ash-former mixture, as is used according to the previously described aspect of the invention for injection into the combustion chamber of the internal combustion engine.

According to a further aspect of the invention, an internal combustion engine, in particular a spark-ignition engine, for a motor vehicle is provided, having: a) at least one cylinder with a combustion chamber, b) a water injection system with a tank and at least one injection nozzle for directly or indirectly injecting water into the combustion chamber, wherein, for the injection, use is made of a mixture of water and an ash former, in particular according to one of the preceding claims, c) an exhaust-gas system with at least one exhaust-gas catalytic converter and a particulate filter device which has a particulate filter for the filtration of particulates, in particular of soot and/or ash particulates, out of an exhaust-gas flow conducted out of the combustion chamber in the exhaust-gas system, d) a control unit for condition monitoring, in particular by means of determining a filter condition, and for controlling the combustion in the cylinder.

The control unit is designed in particular to influence operation of the water injection system in such a manner that less or no water and ash-former mixture is injected if an exhaust-gas temperature in the exhaust-gas flow lies within a predetermined exhaust-gas temperature range. A temperature range should also be understood here as meaning in particular that the range includes every temperature above or below a limit value (in particular belonging to the range).

According to one embodiment, the internal combustion engine does not differ, at least in respect of its embodied features, from an internal combustion engine that is known per se and has a water injection system. However, according to various embodiments, differences can be provided in particular in respect of the activation of the water injection system; this activation can be coordinated in particular with the injection of the water and ash-former mixture—instead of water or of a water mixture conventionally used for injecting water in the corresponding type of engine. Such an adaptation of the activation in comparison to known water injection systems is described here at a later point.

According to a further aspect of the invention, a motor vehicle is provided which has an internal combustion engine according to one embodiment of the invention.

The invention is based, inter alia, on the finding that the filtration efficiency of Otto particulate filters is dependent on the degree of loading thereof with soot and/or ash particulates. A new particulate filter installed free of soot and free of ash has a filtration efficiency of approx. 50% to 85%, depending on the substrate and operating point. During the normal driving mode, it takes the first 2000 to 10 000 km (depending on the oil consumption and the size of the particulate filter) to reach an ash loading amount which leads to an increase of the filtration efficiency to a required extent of approx. 99%. Soot also increases the filtration efficiency, but ash has a number of advantages here over soot, including the lower increase in counterpressure and a lower sensibility to counterpressure (soot elbow; less deep-bed filtration for ash, inter alia, because the particulates may be more rigid and/or larger than in the case of soot) upon an additional loading with soot.

The invention is also based, inter alia, on the finding that the desired filtration efficiency of approx. 99% should be achieved as rapidly as possible. In particular, this operation should not require several thousand kilometers of driving the vehicle. For the reasons already mentioned, loading of the particulate filter with ash particulates prior to fitting into the particulate filter device of the exhaust-gas system is not, however, expedient.

The invention is now based, inter alia, on the concept of introducing an ash former in a suitable manner to a newly fitted particulate filter in the motor vehicle such that the exhaust-gas flow has an increased ash percentage, at least until the filter is loaded with sufficient ash particulates, that is to say in particular with one to two, four or eight grams, in the case of typically used types of filter and sizes of filter, in order to achieve the desired filtration efficiency.

This is achieved within the context of the invention by an ash former being introduced into the water used in any case for the water injection system.

It is thereby ensured that the introduction of ash former can always be stopped if an engine operating state is present, in which damage to the lambda probe and/or a catalytic converter is threatened by the ash particulates that additionally arise during the combustion, for example if the exhaust-gas temperature is too high.

According to one embodiment, the ash-former concentration can be selected depending on the size of the water tank, by the concentration of the metal salts in the water. While, in a known solution, a high ash-former concentration in the fuel tank requires a high naphtha percentage (for dissolving the ash former in the fuel) and therefore leads to a high knocking tendency or to an increased deposition in the engine and at the catalytic converter, this can be avoided, according to one embodiment, even if there is a high ash-former concentration, for example in the case of a small water tank, by only ever a small quantity of water containing ash former being injected into the combustion chamber. In this case, it may be necessary, according to one embodiment, to limit the power of the engine for the duration of the water injection until the water containing the ash former has been converted completely or up to a certain value in the combustion chamber.

Unlike when ash former is added in the fuel tank, the ash concentration by water injection can thus always be kept low, which is associated with fewer depositions in the injection system, combustion chamber, spark plug and/or at the outlet valves. This is desirable because this deposition may influence the operation of the engine and, because of an increased knocking tendency, may even damage the engine.

By adding ash former via the injection water, the lambda probes and the catalytic converters are therefore less contaminated since it is possible to achieve a lower ash concentration and an admission of ash at less harmful temperatures for the catalytic coatings in the catalytic converters and on the lambda probes.

The deactivation with pure ash is greater at higher temperatures. If ash in combustion with unburned oil meets catalytic coatings, the ash together with the phosphorus contained in the oil reacts with the coating even at low exhaust-gas temperatures (400-600° C.). Harmful phosphate compounds arise, in particular in the high load range (high rotational speeds and high loads) because of the additionally high oil consumption. According to one embodiment, the ashing therefore preferably takes place in the lower/average part load operation of the engine.

Disadvantageous temperature ranges for the ashing are dependent on the ash former. Taking the example of a zinc-based ash former: up to approx. 500° C., zinc forms what is referred to as flaky ash which can be removed again, for example by means of high-temperature regeneration of the exhaust-gas system. Above approx. 500° C., the zinc ash becomes more fluid. As the temperature increases, the gas permeability of the deposits drops, and the zinc partially diffuses into lower layers of the coating, in particular also in the particulate filter. Above approx. 900° C., there is a viscous liquid which uniformly coats the surface. The deposits become as hard as glass and can no longer be regenerated under actual operating conditions.

Taking the example of a magnesium based ash former: in the event of an excess of oxygen and temperatures of over 600° C., magnesium together with aluminum occurring in the wash coat forms spinel, the more so the further the temperature exceeds 600° C. In order to permit selective preliminary ashing which takes place in particular only if not harmful for other components, such as the lambda probe or a catalytic converter, or only to an extent which does not cause damage, the method according to one embodiment has the following method step of: influencing the operation of the water injection system, in particular by means of the control unit, in such a manner that less or no water and ash-former mixture is injected if an exhaust-gas temperature in the exhaust-gas flow lies within a predetermined exhaust-gas temperature range.

In particular, the predetermined exhaust-gas temperature range is determined here by the fact that it extends above a limit temperature of in particular 700° C. or lower, 600° C. or lower, 500° C. or lower, or 400° C. or lower.

To avoid adversely affecting the operation of the engine, according to one embodiment the water injection is metered, in particular by means of the control unit, in such a manner that the concentration of the ash former in a mixture of the injected fuel and the injected water and ash-former mixture is less than 100 ppm, in particular less than 50 ppm.

In order to achieve a sufficient ash loading of the particulate filter as rapidly as possible, according to one embodiment the following method steps are provided: triggering a loading operating state of the water injection system if an unused particular filter and/or a particulate filter not sufficiently loaded with ash is installed in the particulate filter device; during the loading operating state, influencing the operation of the water injection system, in particular by means of the control unit, in such a manner that more water and ash-former mixture is injected and/or water and ash-former mixture is injected for a longer time.

In order only to excite the increased production of ash if it is required, according to one embodiment the following method step is provided: ending the loading operating state, in particular in accordance with a period of time which has expired and/or an injected quantity of water and ash-former mixture since the triggering and/or in accordance with a degree of loading of the particulate filter.

So that ash (x oxide) arises in the combustion chamber from the nitrates or sulfates or chlorides or sulfides dissolved in the water as ash former, free oxygen is necessary. In order not to promote the formation of spinel under certain temperature conditions, in these conditions, however, free oxygen should rather be avoided. According to one embodiment, the value expedient in the respective operating situation for the exhaust-gas lambda is calculated in the control unit on the basis of the oxygen necessary for the oxidation of the ash. In this case, the control unit requires in particular the information about the ash concentration in the water tank (stored in the control unit), the injected quantity of water (stored in the control unit), the injected quantity of fuel (stored in the control unit) and/or the actual lambda value (lambda probe signal).

According to one embodiment, an oxygen percentage in the air and fuel mixture for combustion is influenced in such a manner that, during the combustion, sufficient oxygen is provided for forming ash, in particular for forming metal oxide ash. In particular, a lean (or at least a leaner) exhaust-gas lambda, for example of greater than 1, is set for this purpose.

If a magnesium salt is used as ash former, in order to avoid formation of spinel above combustion temperatures of 600° C., a lambda value upstream of the catalytic converter can be set to be smaller than or equal to 1.

According to various embodiments, the injection nozzle is arranged on the combustion chamber of the cylinder and/or in a feed pipe for a fuel and air mixture and/or the injection nozzle for the water and ash-former mixture is formed together with a fuel injection nozzle.

Advantageous embodiments of the various aspects of the invention are the subject matter of the dependent claims. Further features, advantages and possibilities of use of the invention will emerge from the description below in conjunction with the figures.

DETAILED DESCRIPTION OF THE DRAWINGS

Figure 1:
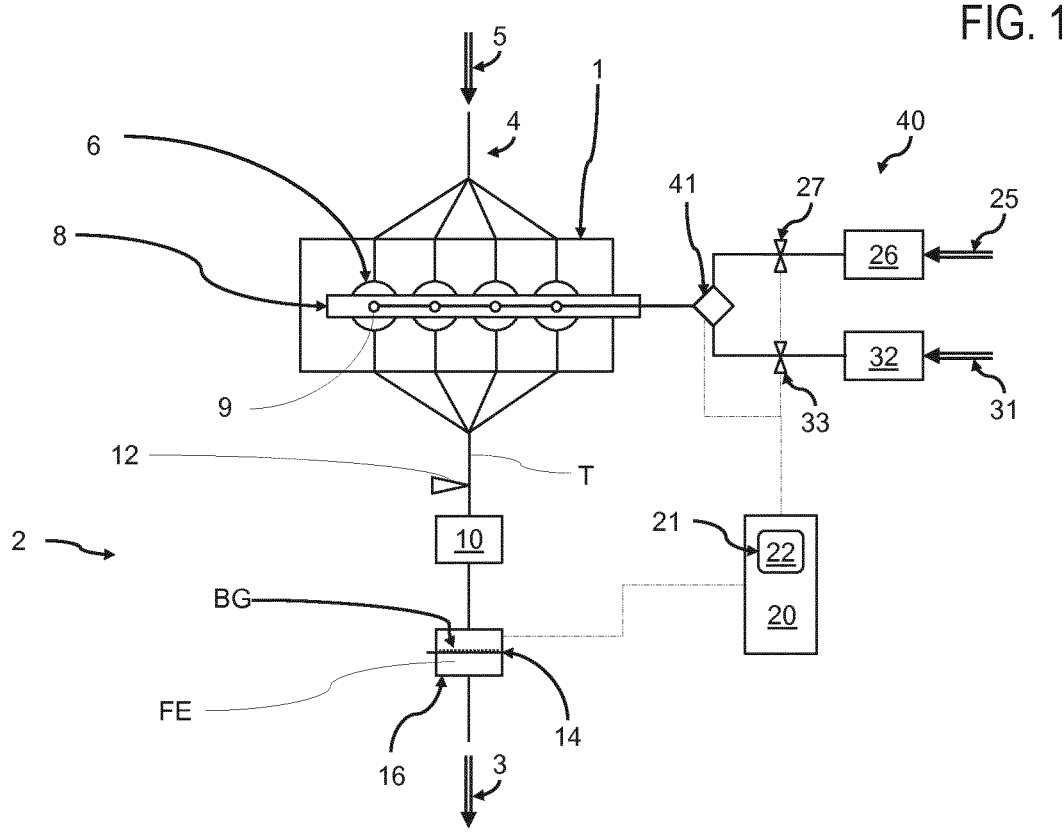
FIG. 1 shows an internal combustion engine according to an exemplary embodiment of the invention with a water injection system and an exhaust-gas system which has a particulate filter device, in a schematic view.

FIG. 1 illustrates an internal combustion engine 1 with an exhaust-gas system 2. In the exemplary embodiment, the internal combustion engine 1 is a four-cylinder spark-ignition engine, but it may also be a different type of engine, for example a diesel engine, and/or may have a different number of cylinders. The engine 1 is supplied with charge air by means of a charge air supply 4 (the top arrow with two dashed lines represents the supply of fresh air 5 in a simplified manner). Charge air and fuel and a water and ash-former mixture are provided in a jointly formed fuel and water injection system 40 into the cylinders 6 at the cylinder heads via a common rail 8.

After the combustion, the exhaust-gas flow is removed from the cylinders 6 by means of the exhaust-gas system 2, wherein the exhaust-gas system 2 has at least one first lambda probe 12 and a three-way catalytic converter 10 downstream of the latter. The regulating circuit of the catalytic converter 10, optionally taking measurement values of the lambda probe(s) 12 into consideration, is not the subject matter of the invention, and therefore the activation thereof is also not illustrated here.

A particulate filter 14 of a particulate filter device 16 of the internal combustion engine 1, which particulate filter can optionally be regenerated in respect of soot particulates and at any rate can be exchanged, is arranged in the exhaust-gas flow downstream of the catalytic converter 10. Downstream of the particulate filter 14, the after-treated and ash-filtered exhaust gas is blown out into the environment, for example at an exhaust tail pipe (the bottom arrow with two dashed lines represents the exhaust tail pipe system for the exhaust gases 3 in a simplified manner). The exemplary embodiment is described with a particulate filter 14 arranged downstream of the catalytic converter 10; in other exemplary embodiments, not illustrated, of the invention, the particulate filter device may, of course, also be operated with a particulate filter which has a catalytic coating, and therefore the catalytic converter 10 and the particulate filter 14 are combined.

The particulate filter device 16 is designed in such a manner that the particulate filter 14 can be exchanged. Newly inserted particulate filters 14 normally do not have any soot and/or ash loading, and therefore, after the particulate filter 14 has been exchanged and also when the vehicle is started up with a new particulate filter 14, the degree of loading BG of the particulate filter is 0 (zero). At a degree of loading BG of 0 and also at a low degree of loading, the particulate filter 14, however, achieves only a filtration efficiency FE of approximately 50% to 85% depending on the substrate and operating point (within the context of the invention, customary particulate filters which are known per se, for example customary Otto particulate filters OPFs are preferably used). In order to permit operation of the internal combustion engine 1 with as low a level of pollutants as possible and therefore in particular also to be able to meet the existing pollutant standards, a higher filtration efficiency FE, in particular in the maximum range above approximately 99%, is, however, required. For this purpose, it is necessary for the particulate filter 14 to be loaded with a certain amount of ash which corresponds here to a required minimum degree of loading $BG_{min}$. For example, in the case of conventional OPF sizes and types, an absolute loading with approx. 1 to 2 grams of ash may be required for this purpose.

The combined fuel and water injection system 40 has a dedicated combined fuel and water injection nozzle 9 for each cylinder 6. Each of the combined injection nozzles 9 is connected to a fuel and water pump 41 by means of a pressure line. The pump 41 is fed both by a fuel tank 26 and by a water tank 32. The fuel supply to the pump 41 is regulated by means of an infinitely regulable fuel valve 27, the water supply by means of an infinitely regulable water valve 33.

In an alternative refinement, not illustrated, of the combined fuel and water injection system 40, the water and ash mixture is injected into the fuel line downstream of a low-pressure fuel pump, but upstream of a high-pressure fuel pump, in particular via a water injection valve. The water and ash fuel mixture is then injected into the cylinder/ the cylinders via the high-pressure fuel pump and the common rail.

In addition, the internal combustion engine 1 has a control unit 20 in which, at least in the exemplary embodiment, a filter operating model 22 is stored. The filter operating model 22 and/or sensors, not illustrated, can be used to undertake filter condition monitoring 21, by means of which, for example, a current degree of loading of the filter can be determined. The control unit 20 is connected to the particulate filter device 16 by means of a double-dotted dashed line, in particular for detecting a newly inserted particulate filter 14. Furthermore, the control unit 20 is connected to these components (see double-dotted dashed lines) in order to activate the valves 27 and 33 and the pump 41.

In order, by means of a method according to an exemplary embodiment of the invention, to achieve as rapid a preliminary ashing of the particulate filter 14 as possible (i.e. in order as rapidly as possible to achieve the minimally necessary degree of loading $BG_{min}$, and therefore to ensure sufficiently high filtration efficiency FE), according to one embodiment of the invention, the water tank 32 of the water injection system 40 is not filled with pure water or with the mixture customary for a pure water injection system, but rather with a water and ash-former mixture 31 within the context of the invention.

For this purpose, the exemplary embodiment makes use of a modern spark-ignition engine which is known per se and which in any case has an indirect or direct water injection 30, 40 into the combustion chamber of each cylinder 6 in order to reduce the temperature in the combustion chamber and therefore also to reduce the emissions. Structural adaptations of such a modern spark-ignition engine to the use of the water and ash-former mixture 31 are not required in the exemplary embodiment.

In order to produce the water and ash-former mixture 31 used, a portion of 750 ppm of magnesium is added to the water in the exemplary embodiment, in particular in the form of magnesium nitrate or in the form of another magnesium salt, wherein the magnesium nitrate or the other magnesium salt is dissolved in the water.

The interaction of tank size (or tank filling) and quantity of ash former is balanced out in such a manner that, in the combination of internal combustion engine and exhaust-gas system of the exemplary embodiment, the introduced ash former suffices to load the particulate filter with this tank filling with 1-2 grams of magnesium oxide ash.

When other ash formers are used, other quantities of ash may be required for filling a standard particulate filter, for example, approx. 5× the quantity of ash, i.e. 5-10 grams in the case of CaO, ZnO or other ash.

Which metal salt or which other suitable compound or which combination of elements or compounds in which portions by volume is added as ash former in an individual case can be decided by a person skilled in the art depending on the type of engine and/or the existing combination of catalytic converters.

Figure 2:
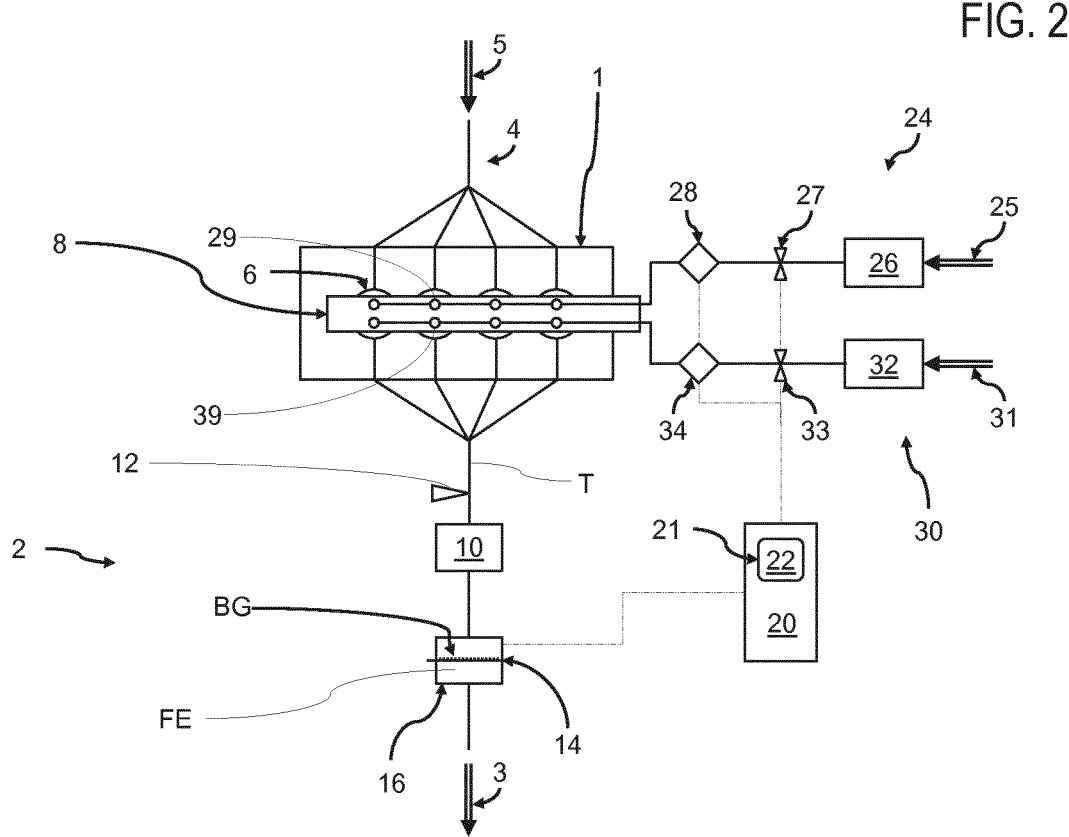
FIG. 2 shows an internal combustion engine according to a further exemplary embodiment of the invention with a water injection system and an exhaust-gas system which has a particulate filter device, in a schematic view.

FIG. 2 shows another internal combustion engine 1 according to a further exemplary embodiment of the invention. The internal combustion engine 1 illustrated in FIG. 2 differs from that according to FIG. 1 primarily in that the fuel 25 and the water and ash-former mixture 31 are injected into the respective cylinders 6 in separate injection nozzles 29 and 39, respectively. For this purpose, a separate fuel injection system 24 and a separate water injection system 30 are provided. The fuel injection system 24 has a separate fuel pump 28. The water injection system 30 has a separate water pump 34.

Figure 3:
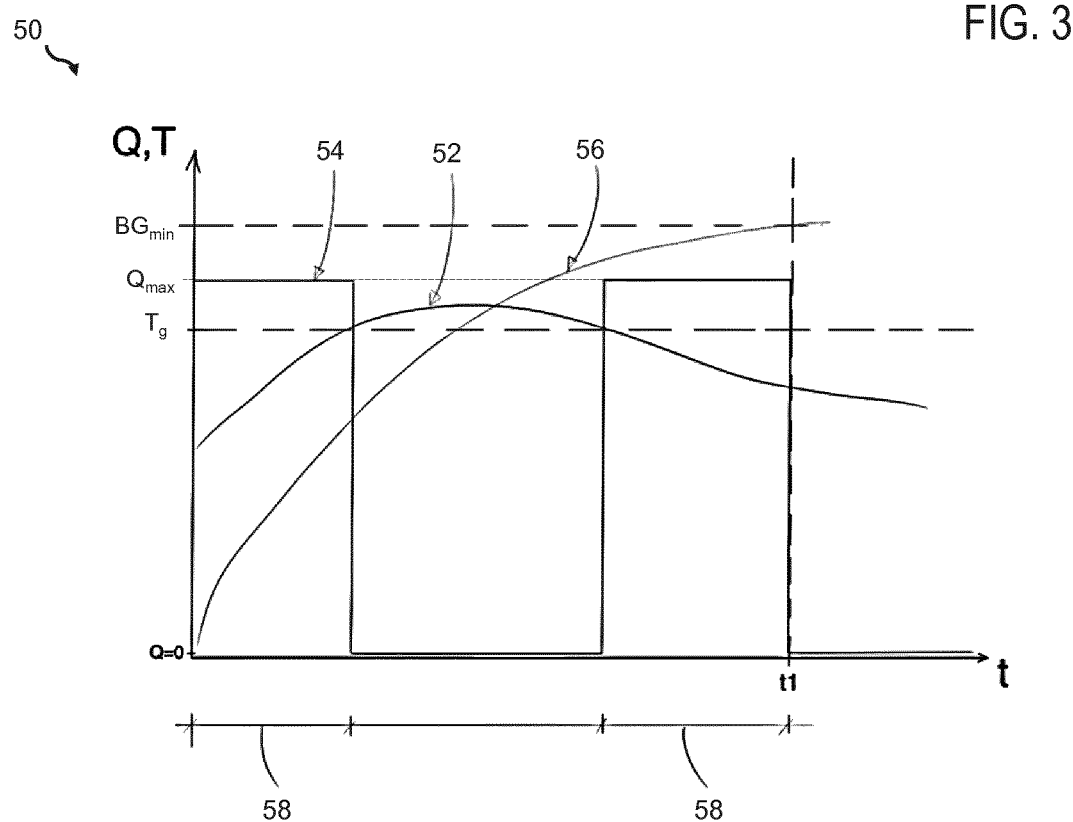
FIG. 3 shows a diagram in which time profiles of a volume flow of the water and ash-former mixture, of an exhaust-gas temperature upstream of the first lambda probe and of a degree of loading are plotted, in order to explain a method according to an exemplary embodiment of the invention.

Apart from these differences, the two internal combustion engines 1 illustrated are formed in a manner corresponding to each other in respect of the exemplary method described in FIG. 3, and therefore the method can be carried out for both internal combustion engines.

FIG. 3 illustrates a diagram 50 in order to explain an exemplary method for operating an internal combustion engine 1 in a motor vehicle. The internal combustion engine 1 can be designed in particular as illustrated in FIG. 1 or as illustrated in FIG. 2.

The diagram 50 illustrates mutually associated time profiles 52, 54 and 56 of a volume flow Q of the water and ash-former mixture 31 (profile 54), of an exhaust-gas temperature T upstream of the first lambda probe 12 (profile 52) and of a degree of loading (BG) of the particulate filter 14 with ash (profile 56).

The diagram shows the operation of the internal combustion engine of a new vehicle in which a brand-new particulate filter 14 having a degree of loading BG of 0 is installed. For as rapid a preliminary ashing of the particulate filter 14 as possible, the water tank 32 has been filled with a water and ash-former mixture 31 as described in FIG. 1.

The control unit 20 recognizes that a new empty (BG=0) particulate filter 14 is installed in the particulate filter device 16 and triggers a loading operating state 58. In order to ash the particulate filter 14 as rapidly as possible such that the desired filtration efficiency of 99% is reached, the control unit 20 triggers a maximum volume flow $Q_{max}$ of the water injection system 30, 40 during the normal operation of the internal combustion engine 1.

For as long as the exhaust-gas temperature T remains beyond a predetermined exhaust-gas temperature range above a limit value $T_g$, an ash former is introduced into the combustion chambers of the cylinder 6 such that rapid ashing of the particulate filter 14 causes a rapid rise in the degree of loading BG.

When the exhaust-gas temperature T reaches the limit value $T_g$ or lies above the latter (and therefore lies within the predetermined exhaust-gas temperature range), the operation of the water injection system 30 or 40 is influenced in such a manner that no more water and ash-former mixture is injected. This makes it possible to avoid damage to the lambda probes 12 and/or to the catalytic converter 10 for as long as the exhaust-gas temperature T remains within the harmful range.

It can also be gathered from the diagram 50 that the loading operating state 58 is triggered again and therefore the water injection system is switched on again as soon as the exhaust-gas temperature T is non-critical again.

The water injection system is switched off at the time $t_1$. The time $t_1$ can be defined, for example, by the filter operating model 22 being used, depending on the preceding operation of the water injection system, to determine that the required degree of loading $BG_{min}$ is reached. Alternatively, the time $t_1$ can also be defined by the fact that the filling of the water tank 32 with water and ash-former mixture is used up. For example, pure water and/or the water mixture normally used for a water injection system in order to reduce the exhaust-gas temperatures can subsequently be introduced again into the tank 32.

In a further exemplary embodiment, not illustrated, it can be provided that the water tank 32 is filled only with water or with a conventional water mixture for the water injection system for reducing the exhaust-gas temperature and in addition an ash-former tank is provided from which ash former can be added when required to the water in the tank 32 in order to assist a rapid preliminary ashing of the particulate filter 14 if this is necessary. For example, the addition of the ash former can be ended when the required degree of loading $BG_{min}$ is reached.

LIST OF REFERENCE SIGNS

1 Internal combustion engine
2 Exhaust gas system
4 Charge air supply
6 Cylinder
8 Common rail
9 Common fuel and water injector
10 Three-way catalytic converter
12 First lambda probe
14 Particulate filter
16 Particulate filter device
20 Control unit
21 Filter state determination
22 Filter operating model
24 Fuel injection system
25 Fuel filler neck
26 Fuel tank
27 Fuel valve
28 Fuel pump
30 Water injection system
31 Water filler neck
32 Water tank
33 Water valve
34 Water pump
29 Water injector
40 Combined fuel and water injection system
41 Combined fuel and water pump
50 Diagram
52 Profile of the exhaust-gas temperature T over time
54 Profile of the volume flow Q over time
56 Profile of the degree of loading BG over time
58 Loading operating state
BG Degree of loading of the particulate filter
FE Filtration efficiency of the particulate filter
T Temperature of the exhaust gas upstream of the first lambda probe
Q Volume flow of the water and ash-former mixture
t Time

What is claimed is:

1. A method for operating an internal combustion engine in a motor vehicle, wherein the internal combustion engine has:
at least one cylinder with a combustion chamber,
a water injection system with a tank and at least one injection nozzle for directly or indirectly injecting water into the combustion chamber,
an exhaust-gas system with at least one exhaust-gas catalytic converter and a particulate filter device which has a particulate filter for filtering particulates out of an exhaust-gas flow conducted in the exhaust-gas system,
a control unit for condition monitoring and for controlling the combustion in the cylinder,
wherein the method comprises:
filling the tank of the water injection system with a mixture of water and an ash former; and
operating the internal combustion engine using the mixture.

2. The method according to claim 1, wherein the ash former has a metal salt.

3. The method according to claim 1, wherein
a concentration of the ash former in the mixture is between 100 ppm and 2000 ppm.

4. The method according to claim 1, wherein
the mixture is an aqueous solution of the ash former in the water and/or a water-based suspension of the ash former and of the water.

5. The method according to claim 1, further comprising:
influencing the operation of the water injection system such that less or no water and ash-former mixture is injected if an exhaust-gas temperature in the exhaust-gas flow lies within a predetermined exhaust-gas temperature range.

6. The method according to claim 5, wherein
the predetermined exhaust-gas temperature range is above a limit temperature of 500° C.

7. The method according to claim 1, wherein
the water injection system is metered such that a concentration of the ash former in a mixture of the injected fuel and the injected water and ash-former mixture is less than 100 ppm.

8. The method according to claim 1, further comprising:
triggering a loading operating state of the water injection system if an unused particulate filter is installed in the particulate filter device; and
during the loading operating state, influencing the operation of the water injection system in such a manner that more water and ash-former mixture is injected and/or water and ash-former mixture is injected for a longer time.

9. The method according to claim 8, wherein
an oxygen percentage in the air and fuel mixture is increased in such a manner that sufficient oxygen is provided for forming ash.

10. An internal combustion engine, for a motor vehicle, comprising:
at least one cylinder with a combustion chamber;
a water injection system with a tank and at least one injection nozzle for directly or indirectly injecting water into the combustion chamber, wherein, for the injection, use is made of a mixture of water and an ash former;
an exhaust-gas system with at least one exhaust-gas catalytic converter and a particulate filter device which has a particulate filter for filtering particles out of an exhaust-gas flow conducted in the exhaust-gas system;
a control unit for condition monitoring and for controlling the combustion in the cylinder, wherein
the control unit is configured to influence operation of the water injection system in such a manner that less or no water and ash-former mixture is injected if an exhaust-gas temperature in the exhaust-gas flow lies within a predetermined exhaust-gas temperature range.

11. The internal combustion engine according to claim 10, wherein
the injection nozzle is arranged on the combustion chamber of the cylinder and/or in a feed pipe for a fuel and air mixture, or
the injection nozzle for the water and ash-former mixture is formed together with a fuel injection nozzle.

12. A motor vehicle comprising an internal combustion engine according to claim 10.

* * * * *